Oct. 12, 1954  C. H. GEORGE  2,691,213
APPARATUS FOR UNCOILING AND RECOILING CABLES
Filed May 1, 1952  5 Sheets-Sheet 1
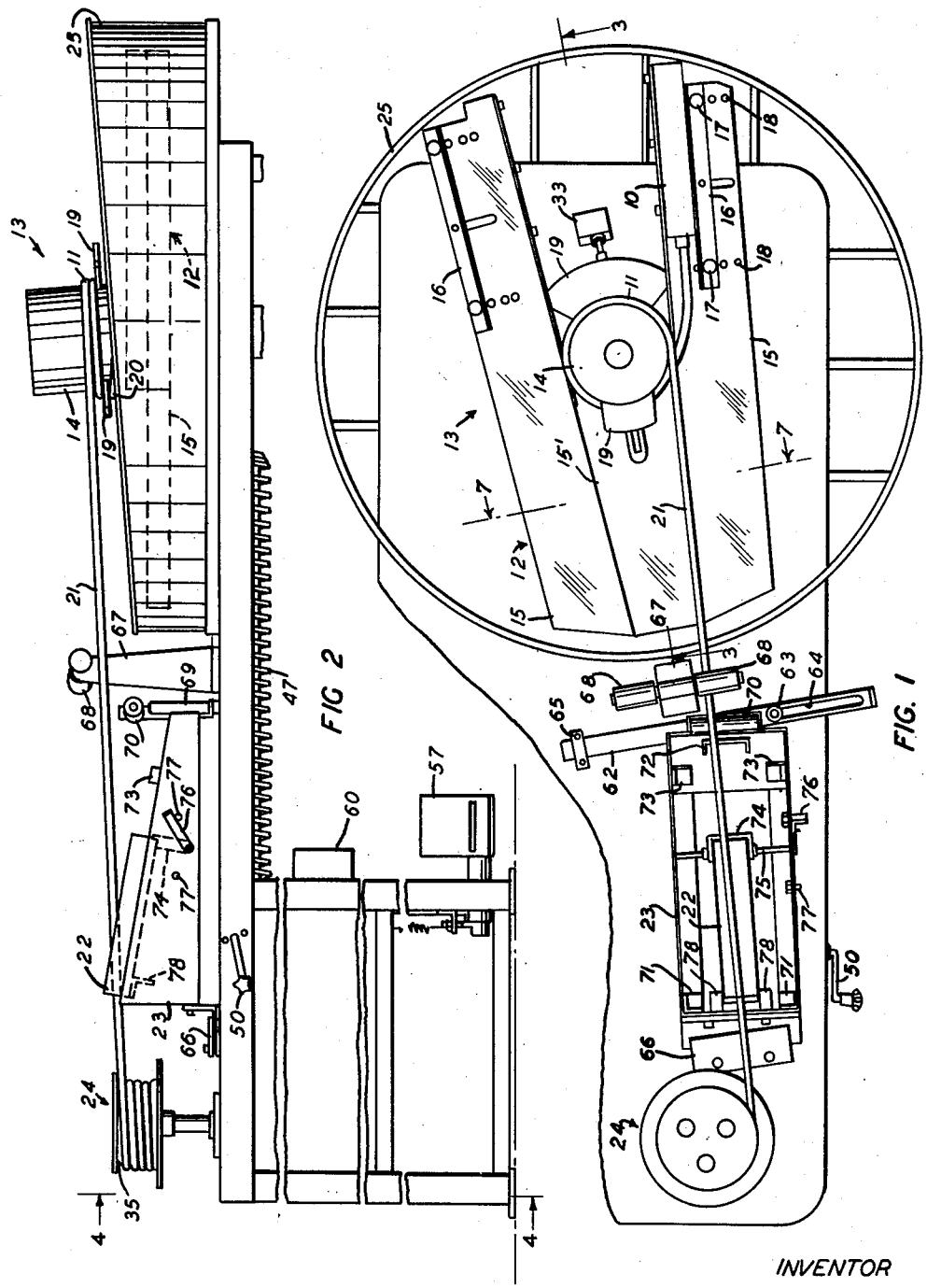
INVENTOR
C. H. GEORGE
BY
ATTORNEY Oct. 12, 1954 C. H. GEORGE 2,691,213
APPARATUS FOR UNCOILING AND RECOILING CABLES
Filed May 1, 1952 5 Sheets-Sheet 2

INVENTOR
C. H. GEORGE
BY
ATTORNEY

Oct. 12, 1954 C. H. GEORGE 2,691,213
APPARATUS FOR UNCOILING AND RECOILING CABLES
Filed May 1, 1952 5 Sheets-Sheet 3

INVENTOR
C. H. GEORGE
BY
ATTORNEY

Oct. 12, 1954   C. H. GEORGE   2,691,213
APPARATUS FOR UNCOILING AND RECOILING CABLES
Filed May 1, 1952   5 Sheets-Sheet 4

INVENTOR
C. H. GEORGE
BY
ATTORNEY

Oct. 12, 1954 C. H. GEORGE 2,691,213
APPARATUS FOR UNCOILING AND RECOILING CABLES
Filed May 1, 1952 5 Sheets-Sheet 5

INVENTOR
C. H. GEORGE
BY
ATTORNEY

Patented Oct. 12, 1954

2,691,213

UNITED STATES PATENT OFFICE 2,691,213

APPARATUS FOR UNCOILING AND RECOILING CABLES

Carroll H. George, Baltimore, Md., assignor to Western Electric Company, Incorporated, New York, N. Y., a corporation of New York Application May 1, 1952, Serial No. 285,422

5 Claims. (Cl. 29—241)

1

This invention relates to apparatus for uncoiling and recoiling cables, and more particularly to apparatus for simultaneously uncoiling a cable stub, pulling it through an aperture, and recoiling the cable.

The telephone industry utilizes a cable terminal to which the conductors of a distribution cable are connected, and to which the wires that drop from a telephone pole to a number of subscriber's residences can be readily connected. This terminal is a block assembly enclosed in a weatherproof box with a lead covered cable stub protruding through an aperture in one end thereof. As a matter of manufacturing convenience, such cable terminal blocks are made in pairs, two blocks being joined together by a length of cable which is coiled to conserve space. Near the final stages of the assembly procedure, the length of cable is severed to separate the two terminal blocks, leaving each block with a coil of cable stub secured thereto. Each terminal block is then individually housed in a weatherproof box having a hinged cover and an aperture in one end thereof.

In order to house a terminal block in one of the boxes, the cable stub secured to the block must be uncoiled and pulled through the aperture in the end of the box. It is also desirable that the cable stub protruding from the end of the box be formed into a coil to conserve space during storage and shipment of the completed product. Heretofore, it has been an entirely manual operation to uncoil the cable stub secured to a terminal block, pull the cable stub through the hole in the end of its weatherproof box, and then recoil the cable stub protruding outside of the box after the block has been placed therein. This has been a cumbersome operation, because some terminal blocks may have cable stubs as much as 25 feet long, and the lead sheathed cable stubs are difficult to manipulate because they are relatively stiff and bulky.

An object of the invention is to provide new and improved apparatus for uncoiling and recoiling cables.

Another object of the invention is to provide new and improved apparatus for simultaneously uncoiling a cable stub, pulling it through an aperture, and recoiling the cable stub.

An apparatus illustrating certain features of the invention may include a rotatable table designed to support an article, an arbor mounted in the axial center of the table for supporting a coil of cable stub that is secured to the article, a recoiling head spaced from the table for pulling the cable from the coil and recoiling it, and means for rotating the recoiling head.

A complete understanding of the invention may be obtained from the following detailed description, when read in conjunction with the appended drawings, in which Fig. 1 is a plan view of an apparatus illustrating certain features of the invention;

Fig. 2 is a side elevation view of the apparatus shown in Fig. 1;

Figure 3:
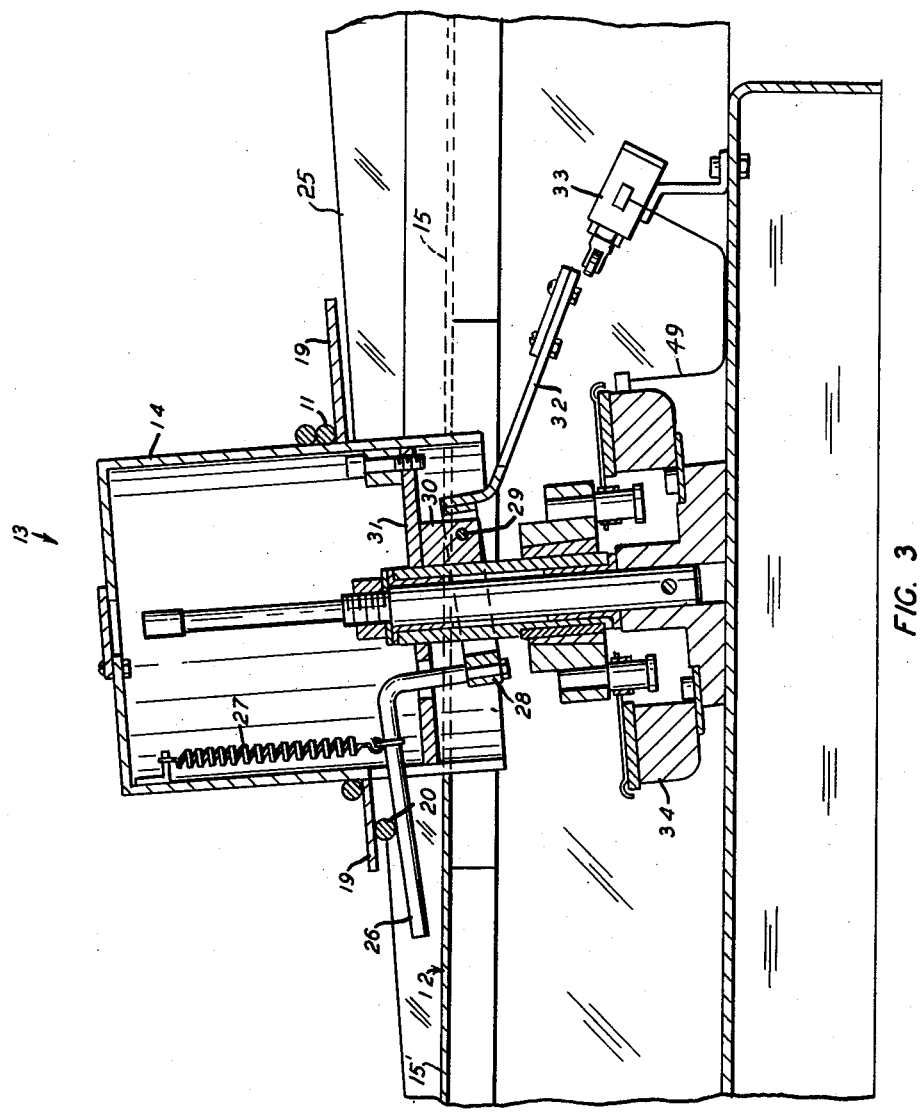
Fig. 3 is an enlarged, fragmentary, vertical section taken along line 3—3 of Fig. 1.
Figure 4:
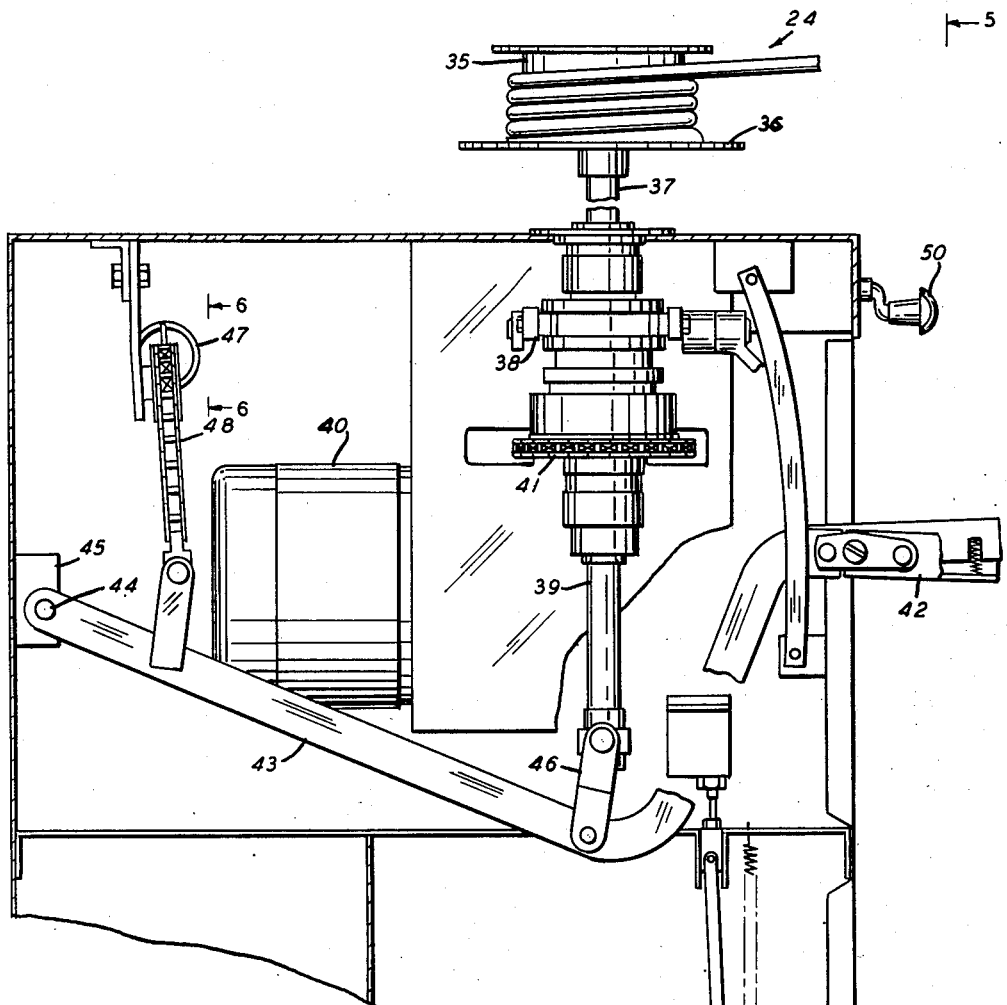
Fig. 4 is an enlarged section taken along line 4—4 of Fig. 2.
Figure 6:
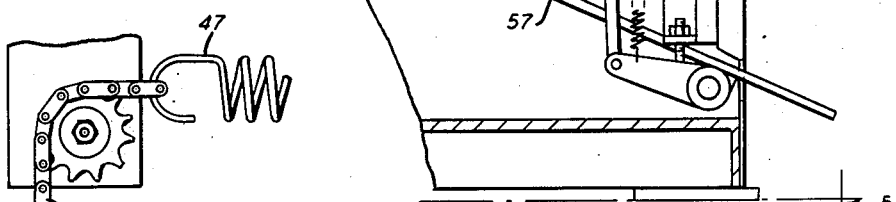
Fig. 6 is a fragmentary, vertical section taken along line 6—6 of Fig. 4.
Figure 5:
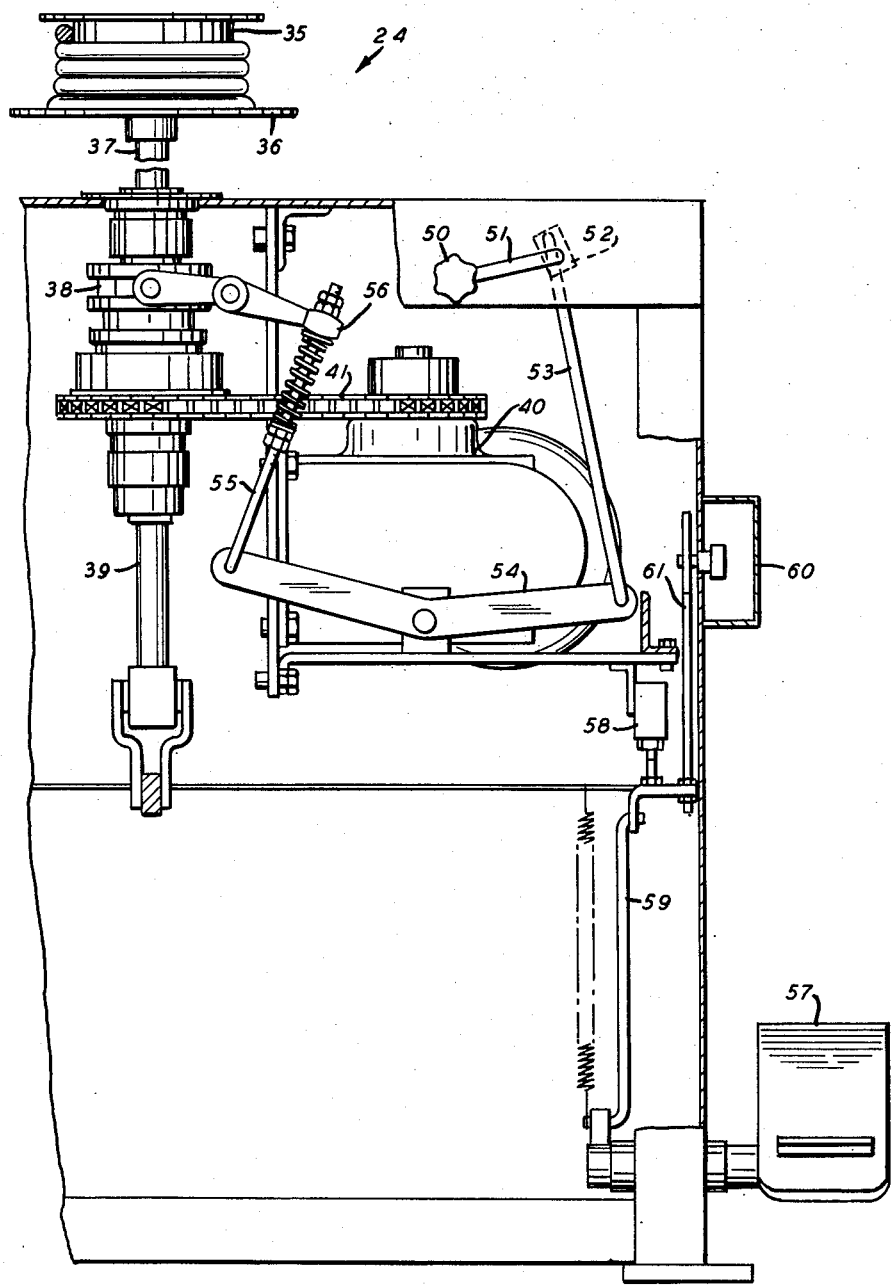
Fig. 5 is a section taken along line 5—5 of Fig. 4.
Figure 7:
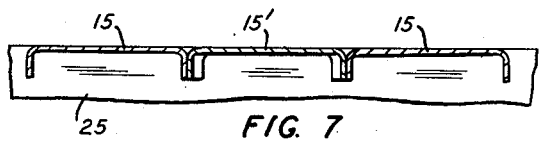
Fig. 7 is a fragmentary vertical section taken along line 7—7 of Fig. 1.
Figure 8:
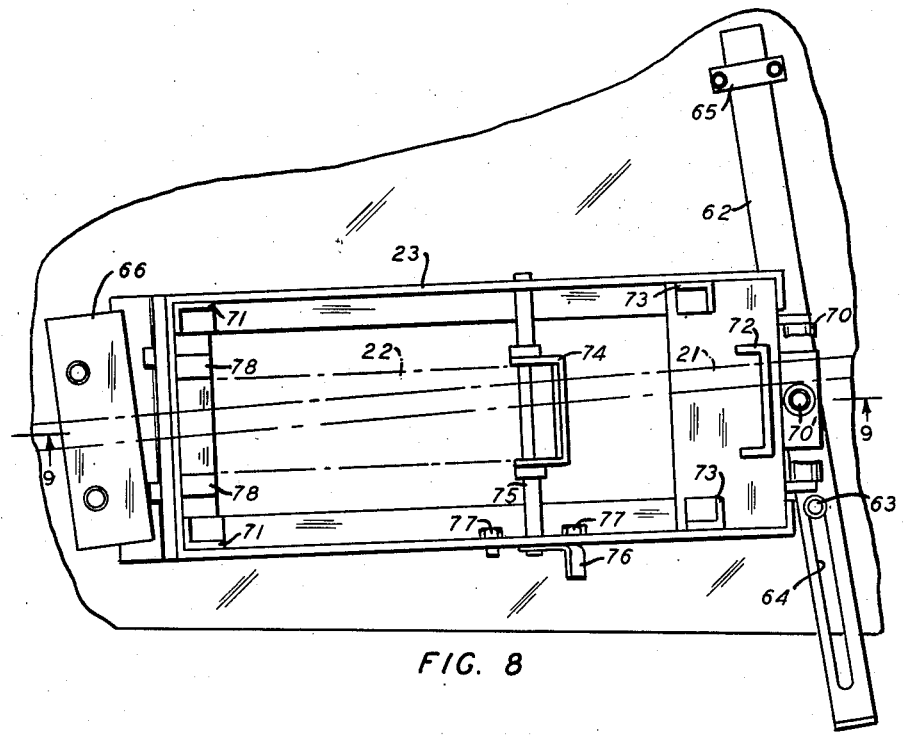
Fig. 8 is an enlarged plan view of a portion of the apparatus shown in Fig. 1, with a portion broken away for clarity.

In attacking the problem of how to uncoil a cable stub secured to a terminal block, thread the cable stub through an aperture in one end of the weatherproof box into which the block is to be placed, and then recoil the cable stub protruding outside the box, consideration must be given to the fact that cable terminal blocks are made in several standard sizes and the cable stubs secured to them correspondingly vary in size. Furthermore, the cable stub secured to a completed terminal block may vary in length from 5 feet to as much as 25 feet long.

A pair of terminal blocks, which need not necessarily be of equal size, may be passed through the assembly operations while joined to the opposite ends of a cable 30 feet long. Near the final stages of the assembly operations, this coiled cable may be cut to provide one terminal block with a 25 foot length and the other block with a five foot length of the cable. Due to the fact that the pair of terminal blocks attached to the coil are arranged to face in the same direction during the assembly operations, the portion of the cable remaining on one of the two blocks when the coil is cut will appear to be coiled with a right hand lay, while the cable on the other block will appear to be coiled with a left hand lay. It is evident that the apparatus used to place the blocks in their weatherproof boxes must be capable of handling both left and right hand coils, and adjustments must be provided to take care of the different sizes of blocks and of cable that may be encountered.

The uncoiling head

A terminal block 10 (Fig. 1) having a coil 11 of cable stub secured to one end thereof, may be positioned upon a freely rotatable table 12 of an uncoiling head 13 with its coil 11 placed over a cylindrical arbor 14 mounted in the axial center of the table. One side of the table 12 is designed to receive a terminal block having a cable coiled with a right hand lay, and the other side of the table is used only when a coil having a left hand lay is encountered. To satisfy these requirements, the table is constructed to include two roughly, rectangular flat sections 15—15 positioned on opposite sides of the arbor 14, and appearing as converging cords of an imaginary circle described by the rotation of the table. On one side of the arbor 14 the sections 15—15 are joined by a reinforcing plate 15[1].

One end of each section 15 of the table 12 is provided with an adjustable clamping plate 16 that may be locked in the proper positions to accommodate terminal blocks of different sizes. A pair of adjustable bolts 17—17 mounted on each clamping plate cooperate with a plurality of apertures 18—18 formed in the sections 15—15 of the table to lock the plates in selected positions. A pair of wings 19—19 are secured to opposite sides of the arbor 14 for supporting the coil 11 of cable thereon at a higher elevation than the terminal block. These wings are so positioned with respect to the sections 15—15 of the rotatable table 12 that one of the wings is located between the ends of the sections 15—15 designed to support terminal block, and the other wing is located on the directly opposite side of the arbor.

In positioning a terminal block 10 and its attached coil 11 of cable stub upon the uncoiling head 13, the body of the coil is placed over the arbor 14 and seated on top of the wings 19—19, a portion 20 of the cable stub is led beneath the wing 19 that is secured on the side of the arbor 14 that is opposite the terminal block, and the block 10 is secured upon the proper one of the sections 15—15 of the table 12, depending upon whether the coil has a right or a left hand lay. A length 21 of the cable stub is then manually unwound from the coil 11 and fed through a hole in one end of a box 22 into which the terminal block ultimately will be placed. The box 22 is mounted upon a specially designed cradle 23 capable of accommodating boxes of different sizes. The leading end of the length 21 of cable is then secured to a recoiling head 24.

Throughout the uncoiling and recoiling operation the length 21 of the cable remains essentially straight and horizontal. In order to prevent the block 10 from striking the straight length 21 of the cable as the table 12 rotates and the coil 11 is unwound, the rotating axis of the arbor 14 is inclined with respect to the horizontal plane in which the table 12 lies, as is best shown in Fig. 3. This arrangement causes the table 12 to rotate with a wobble action so that the block 10 supported on one of the sections 15—15 of the table always dips below and clears the length 21 of the cable during the rotation of the uncoiling head 13. A vertical, circular guard 25 surrounds the uncoiling head 13 to prevent the rotating table 12 from striking any object. One side of the guard 25 is higher than the other side thereof to correspond with the wobble action of the table 12.

Every time the rotation of the table 12 is stopped at the completion of an uncoiling and recoiling operation, the position of the table 12 relative to the other portions of the apparatus should always be the position illustrated in the drawings. This condition is desired, so that when the rotation of the table is stopped the terminal block 10 may be slid horizontally along the table section 15 directly toward the box 22 and be conveniently seated in the box.

In order to control the stopping of the table, a feeler 26 is urged by a spring 27 against the portion 20 of the cable stub that extends beneath one of the wings 19—19 on the arbor. The feeler 26 is secured to an annular plate 28 which concentrically surrounds the axis of the arbor 14 and is pivotably mounted upon a shaft 29 which extends through a lug 30 projecting below a base plate 31 of the arbor 14. A downwardly projecting arm 32 is secured to the annular plate 28 at a point thereon directly opposite the point at which the feeler 26 is secured thereto.

When the trailing end of a coil of cable is wedged between the feeler 26 and the corresponding wing 19, the annular plate 28 is thereby pivoted into a position in which the projecting arm 32 has a plane of rotation in which it makes no contact as it rotates with the arbor 14. However, when the unwinding of the coil is completed and the portion 20 of the cable stub is snapped out from between the feeler and the wing, the projecting arm 32 is thereby lowered into a plane of rotation in which it strikes a microswitch 33. A magnetic brake 34 connected to the microswitch 33 by an electrical cord 49 is suitably arranged to stop the rotation of the table 12 in the desired position when the microswitch 33 is actuated in this manner. The magnetic brake 34 may also be used to apply a constant small amount of frictional drag to aid in straightening out the cable by keeping the cable under some tension throughout the uncoiling operation.

The recoiling head

The recoiling head 24 includes a reel 35 secured by one flange 36 thereof to a rotatable shaft 37. The body of the reel 35 is detachably secured to the lower flange 36 so that the reel may be disassembled to remove a coiled cable therefrom at the completion of the recoiling operation. The shaft 37 may be engaged by a clutch 38 mounted upon a second rotatable shaft 39 driven by a motor 40 through an endless chain connection 41. The preferred type of motor is one having variable speed and adjustable torque. This type of motor is capable of adjusting automatically the speed in response to changes in tension on the reel to maintain the torque, which is adjusted during the recoiling process by the operator.

The reel 35 may be reciprocated up and down during its rotation to distribute uniformly across the reel the cable being wound thereon. Since the cable stubs handled may have a variety of diameters corresponding with the different sizes of terminal blocks, and such variations in cable size would create complications in the design of an automatic distributor, a manually operable distributor has been selected.

To effect manual reciprocation, an operator may actuate a spring released hand grip 42 attached to one end of a bar 43, the other end of which is pivotally mounted upon a shaft 44 journalled in a side frame 45 of the recoiling apparatus. A link 46 joins the rotatable shaft 39 and the bar 43 so that actuation of the bar 43 may cause the recoiling head 24 to reciprocate. In order to compensate for the fact that the weight of the reel and its contents gradually increases as the cable stub is wound thereon, a compensating spring 47 for urging the reel 35 upwardly is connected to the bar 43 by means of a chain 48.

The operator may actuate the clutch 38 by means of a handle 50 secured to a lever 51 having a cam 52 arranged to engage a rod 53 pivotably joined to a rocker arm 54, which is connected to the clutch by means of another rod 55 and a link 56. This arrangement merely permits the clutch 38 to be moved abruptly into and out of engagement without intermediate gradations in contact, and such intermediate control is unnecessary when the motor 49 is of the adjustable torque type. When a motor of this type is employed, an operator may start the motor by depressing a foot pedal 57 thereby opening a normally closed microswitch 58 by means of a connecting rod 59. The initial speed of this motor may be controlled by a rheostat 60, which is mechanically connected to the foot pedal 57 by means of the connecting rod 59 and a connecting element 61.

If a conventional uncontrolled D. C. electric motor were employed instead of the adjustable torque type motor, the speed and torque variation could be controlled by the partial engagement of the clutch 38 actuated by the foot pedal 57. In this situation the rod 53 would be disconnected from the rocker arm 54, and another link (not shown) would be employed to connect the arm 54 with the foot pedal. In the latter case the rod 59 would be disconnected from the foot pedal, since the actuation of the microswitch 58 and the rheostat 60 would no longer be necessary.

The clutch 38 should be of the slipping type, that may gradually be brought into engagement, and may be adjusted to slip at a preadjusted maximum torque. When an adjustable torque type motor is in use, the slipping feature of the clutch need not be utilized except in so far as it protects the apparatus from a preset maximum torque. The clutch may then be abruptly engaged and disengaged to allow the reel 35 to be rotated by hand during the preliminary operation of attaching the leading end of the cable stub to the reel. The special arrangement of the rocker arm 54 and its associated rods is provided to afford easy interchange of the means for actuating the clutch.

The cradle

The portion 21 of the cable stub which extends from the uncoiling head 13 to the recoiling head 24 travels in a different path when a left hand lay coil is being unwound than when a right hand lay coil is being unwound, as may be deduced from a study of Fig. 1. Since the diameter of the cable stub, the size of the coil of cable and the nature of any kinks that may exist in the cable stub may all affect the path of the portion 21 of the cable stub, it is necessary to be able to adjust the position of the cradle 23 to properly locate it in relation to the path of the cable.

One end of the cradle 23 is pivotally mounted upon a frame 62, which may be horizontally adjusted. The movement of the frame 62 is guided by a fixed bolt 63 mounted within a guideway 64 formed within the frame, while one extremity of the frame 62 may be frictionally engaged by a spring pressed detent (not shown) mounted within a housing 65. The spring pressed detent is capable of engaging the movable frame 62 with sufficient force to hold it in a selected location. The other end of the cradle 23 is frictionally gripped by the sliding engagement of a plurality of plates 66—66 which afford the cradle a considerable latitude of movement horizontally.

In order to guide the portion 21 of the cable stub, in case there are any large kinks therein, a pedestal 67 mounted on the approach side of the cradle is provided with a pair of rollers 68—68 for preventing undue upward movement of the cable. Similarly, a pedestal 69 mounted on this end of the cradle carries a roller 70 for preventing undue downward movement of the cable. The bottom of the pedestal 69 is joined pivotally to the frame 62 by a bolt 70'.

Figure 9:
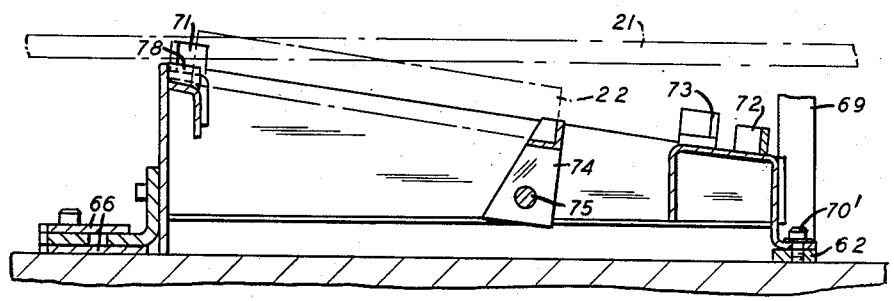
Fig. 9 is a vertical section taken along line 9—9 of Fig. 8.

Near the exit end of the cradle 23 a pair of flanges 71—71 support one end of the box 22 into which the terminal block 10 eventually will be placed. The other end of the box, in the case of long boxes, may be supported by a shelf 72 or by a pair of supporting flanges 73—73, depending upon whether the box is narrow or wide. When a short box is employed, this end of the box may be supported by a plate 74 pivotally mounted on a shaft 75. A handle 76, which may rest upon either one of a pair of stops 77—77, may be turned to bring the plate 74 to the proper elevation to support the end of a box. In the case of wide boxes, the flanges 71—71 are used as supports, while in the case of narrow boxes use is made of a pair of flanges 73—73 which are positioned at a slightly lower level than the flanges 71—71, as shown in Fig. 9.

Operation

The coil 11 is placed over the arbor 14 and arranged to rest upon the upper surfaces of the wings 19—19, which project outwardly from diametrically opposite sides of the arbor. The terminal block 10 that is secured to the trailing end of the coil 11 is placed upon the proper one of the sections 15—15 of the rotatable table 12, depending upon whether the coil 11 is wound with a right or a left hand lay. The block 10 is securely clamped onto the section 15 by means of one of the clamping plates 16—16, the bolts 17—17 carried by this clamping plate 16 being inserted into the proper pair of apertures 18—18 in the section 15 necessary to accommodate the particular size of terminal block being handled.

A portion 20 of the trailing end of the cable stub is wedged between the feeler 26 and the bottom of the wing 19 corresponding thereto. The leading end of the cable stub of the coil 11 is then unwound manually and threaded through the aperture (not shown) provided in one end of the box 22 supported on the cradle 23. The leading end of the cable stub is then pulled manually through this aperture and made secure to the reel 35 on the recoiling head 24. A straight section 21 of cable stub will then extend between the uncoiling head 13 and the recoiling head 24.

As may be observed from a study of Fig. 1, it will be necessary to adjust the position of the cradle 23 to line it up with the straight section 21 of cable stub that extends between the uncoiling head and the recoiling head. The position of both ends of the cradle 23 may be readily adjusted. The end nearest the recoiling head 24 will not require much adjustment in any event, and such adjustment is afforded by relative movement between a plurality of plates 66—66 which frictionally grip this end of the cradle. That end of the cradle 23 that is nearest the uncoiling head 13 may be moved more extensively by adjusting the horizontally movable frame 62 to which this end of the cradle is pivotally attached. When all these adjustments have been made, power may be applied to the recoiling head 24 to unwind the coil 11, pull the cable stub through the aperture in the box 22, and recoil the cable stub on the reel 35. The magnetic brake 34 may be utilized to exert a small amount of frictional drag against the free rotation of the table 12, in order to maintain some tension in the portion 21 of the cable stub that extends between the uncoiling head and the recoiling head.

As the cable coils up on the reel 35, this reel may be reciprocated up and down to distribute the cable uniformly thereon. Such reciprocation may be accomplished manually by grasping the spring released hand grip 42 and suitably actuating the bar 43, to one end of which this grip is secured, to move the reel 35 up and down.

The actuation of the clutch 38 may be accomplished in either of two ways, depending upon the type of motor employed as the motor 40. When an adjustable torque type motor is employed, which motor is capable of automatically adjusting its speed to the changing load, the clutch 38 may be engaged abruptly. In this case the handle 50 would be connected to the rocker arm 54 by the rod 53, and serve to actuate the clutch. Under these conditions, the foot pedal 57 would be utilized to start the adjustable torque motor, and the rheostat 60 would be used to control its initial speed. On the other hand, if a conventional uncontrolled electric motor were employed as the motor 40, the rocker arm 54 would be connected to the foot pedal 57 by means of a link (not shown), so that the foot pedal would be used to actuate the clutch. In this instance the rheostat 60 would serve no useful purpose, and it would be disconnected from the foot pedal 57.

When the coil 11 resting on top of the wings 19—19 has been completely unwound, the portion 20 of the trailing end of the cable stub that is interposed between the feeler 26 and the wing 19 will be snapped out from between these members. The spring 27 will then urge the feeler 26 upwardly, causing the annular plate 28 to pivot and thereby lower the projecting arm 32 into a plane of rotation in which it will strike the microswitch 33. This action causes the magnetic brake 34 to stop the rotation of the table 12 in the position illustrated in Fig. 1.

The operator then stops the recoiling head 24 long enough for him to release the block 10 from the clamping plate 16. As the recoiling head 24 continues to coil the cable, the terminal block 10 is pulled by the cable so that it slides along the section 15 of the table directly toward the box 22, and the last section of cable is wound on the recoiling head 24. At this point the recoiling head may be stopped by releasing the foot pedal 57. The terminal block may then be lifted manually from the table 12 and seated within the box 22. The recoiled cable may be removed from the reel 35 by disassembling this reel.

The above-described apparatus is effective to expedite the manufacture of cable terminal blocks, by alleviating a cumbersome and difficult manufacturing operation. In the case of long cable stubs that form large coils, apparatus embodying the invention has proved to be outstandingly satisfactory. The invention is not limited to the manufacture of cable terminal blocks, and it may be employed advantageously in other fields where similar problems may be encountered.

What is claimed is:

1. Apparatus for simultaneously uncoiling and recoiling a cable stub that is secured to an article, which comprises a rotatable table designed to support such an article, an arbor mounted in the axial center of the table for supporting a coiled cable stud that is secured to the article, a recoiling head spaced from the table so that a length of the cable may be extended from the arbor to the recoiling head, and means for rotating the recoiling head to pull the cable from the arbor and recoil it, the rotating axis of said arbor being inclined with respect to the plane in which the table lies so that during each revolution of the table the article thereon dips below and clears the length of cable that extends from the arbor to the recoiling head.

2. Apparatus for simultaneously uncoiling and recoiling a cable stub that is secured to an article, which comprises a rotatable table designed to support such an article, an arbor mounted in the axial center of the table for supporting a coiled cable stub that is secured to the article, a recoiling head spaced from the table so that a length of the cable may be extended from the arbor to the recoiling head, said arbor being inclined with respect to the plane in which the table lies so that during each revolution of the table the article thereon dips below and clears the length of cable that extends from the arbor to the recoiling head, means for rotating the recoiling head to pull the cable from the arbor and recoil it, and means for reciprocating the recoiling head to distribute the cable uniformly thereon.

3. Apparatus for simultaneously uncoiling and recoiling a cable stub that is secured to an article, which comprises a freely rotatable table designed to support such an article, an arbor mounted in the axial center of the table for supporting a coiled cable stub that is secured to the article, a recoiling head spaced from the table so that a length of the cable may be extended from the arbor to the recoiling head, said arbor being inclined with respect to the plane in which the table lies so that during each rotation of the table the article thereon dips below and clears said length of cable, means for rotating the recoiling head to pull the cable from the arbor and recoil it, clutch means for selectively engaging and disengaging the rotating means with the recoiling head, means for reciprocating the recoiling head during its rotation to distribute the cable uniformly thereon, a cradle positioned between the head and the table for supporting a box having an aperture therein, and means for adjusting the cradle to place it in alignment with the length of cable extending from the arbor to the head, so that all of the cable up to the end that is secured to the article may be drawn through the aperture during the uncoiling and recoiling operation.

4. Apparatus for simultaneously uncoiling and recoiling a cable stub that is secured to a terminal block, which comprises a freely rotatable arbor for supporting a coiled cable stub that is secured to such a block, a pair of flat table sections mounted on opposite sides of the arbor for supporting said block as it rotates with the arbor, means for clamping the block to the table, a recoiling head spaced from the arbor so that a length of the cable may be extended from the arbor to the recoiling head, means for rotating the recoiling head to pull the cable from the arbor and recoil it, clutch means for selectively engaging and disengaging the rotating means with the recoiling head, means for reciprocating the recoiling head during its rotation to distribute the cable uniformly thereon, said arbor being inclined with respect to the plane in which the table sections lie so that during each revolution of the table the block thereon dips below and clears the length of cable that extends from the arbor to the recoiling head, a cradle positioned between the head and the arbor for supporting a box having an aperture therein, and means for adjusting the cradle to place it in alignment with the length of cable extending from the arbor to the head, so that all of the cable up to the end that is secured to the terminal block may be drawn through the aperture during the uncoiling and recoiling operation.

5. Apparatus for simultaneously uncoiling and recoiling a cable stub that is secured to a terminal block, which comprises a freely rotatable arbor for supporting a coiled cable stub that is secured to such a block, a pair of flat table sections mounted on opposite sides of the arbor for supporting said block and rotating with the arbor, means for clamping the block to the table, a recoiling head spaced from the arbor so that a length of the cable may be extended from the arbor to the recoiling head, means for rotating the recoiling head to pull the cable from the arbor and recoil it, clutch means for selectively engaging and disengaging the rotating means with the recoiling head, means for reciprocating the recoiling head during its rotation to distribute the cable uniformly thereon, said recoiling head having a detachable reel upon which the cable stub may be coiled, said arbor being inclined with respect to the plane in which the table sections lie so that during each revolution of the table the block thereon dips below and clears the length of cable that extends from the arbor to the recoiling head, a cradle positioned between the head and the arbor for supporting a box having an aperture therein, and means for adjusting the cradle to place it in alignment with the length of cable extending from the arbor to the head so that all of the cable up to the end that is secured to the terminal block may be drawn through the aperture during the uncoiling and recoiling operation, and means for applying frictional drag against the free rotation of the arbor to maintain some tension on the length of cable extending from the arbor to the head.

References Cited in the file of this patent

UNITED STATES PATENTS

| Number | Name | Date |
|---|---|---|
| 553,935 | Purdy | Feb. 4, 1896 |
| 2,220,481 | Fritts | Nov. 5, 1940 |
| 2,271,416 | Davis et al. | Jan. 27, 1942 |
| 2,349,873 | Lisy | May 30, 1944 |

FOREIGN PATENTS

| Number | Country | Date |
|---|---|---|
| 682,901 | France | Feb. 18, 1930 |